US008405882B2

United States Patent
Cole et al.

(10) Patent No.: US 8,405,882 B2
(45) Date of Patent: Mar. 26, 2013

(54) METHOD AND APPARATUS FOR SECURE DOCUMENT PRINTING

(75) Inventors: John E. Cole, Prosperity, PA (US);
Joseph J. Pfeuffer, Oakdale, PA (US);
Michael R. Riley, Steubenville, OH (US)

(73) Assignee: Troy Group, Inc., Costa Mesa, CA (US)

( * ) Notice: Subject to any disclaimer, the term of this patent is extended or adjusted under 35 U.S.C. 154(b) by 698 days.

(21) Appl. No.: 12/638,593

(22) Filed: Dec. 15, 2009

(65) Prior Publication Data

US 2010/0157378 A1 Jun. 24, 2010

Related U.S. Application Data

(60) Provisional application No. 61/138,848, filed on Dec. 18, 2008.

(51) Int. Cl.
*H04N 1/405* (2006.01)
(52) U.S. Cl. ........................ 358/3.28; 358/1.18; 358/468
(58) Field of Classification Search .................. 358/1.9, 358/2.1, 3.28, 1.15, 1.18, 468, 461, 3.06–3.09, 358/3.14–3.18, 3.2, 3.24
See application file for complete search history.

(56) References Cited

U.S. PATENT DOCUMENTS

| 6,101,293 | A | 8/2000 | McKenzie |
| 8,208,044 | B2 * | 6/2012 | Atanassov et al. ............ 348/241 |
| 2006/0238824 | A1 | 10/2006 | Otake et al. |
| 2007/0281139 | A1 | 12/2007 | Mehta et al. |

OTHER PUBLICATIONS

PCT Notification of Transmittal of the International Preliminary Report on Patentability and the Written Opinion of the International Searching Authority dated Jun. 21, 2011 for International Application No. PCT/US2009/068527 filed Dec. 17, 2009.

* cited by examiner

*Primary Examiner* — Thomas D Lee
*Assistant Examiner* — Stephen M Brinich

(57) ABSTRACT

The invention relates to a method for devising a pantograph. The method includes the steps of defining a message to be displayed on the pantograph, forming a background pixel format and a foreground pixel cluster pattern. The foreground cluster pattern is devised from the background pixel formation. Adjacent pixels in the background pattern are combined to form pixel clusters. The foreground pattern of pixel clusters is used to fill the characters of a pantograph message.

24 Claims, 18 Drawing Sheets

METHOD AND APPARATUS FOR SECURE DOCUMENT PRINTING

CROSS REFERENCE TO RELATED APPLICATIONS

This application claims the benefit of Provisional Patent Application No. 61/138,848, filed Dec. 18, 2008, the disclosure of which is incorporated herein in its entirety.

BACKGROUND OF THE INVENTION

1. Field of the Invention

The invention is directed to a method and apparatus for dynamically encoding a pantograph on an original document which indicates invalidity or inauthenticity when the document is copied. More specifically, the present invention relates to a method and apparatus for devising a pantograph message in real time and as a function of the pantograph background without consuming substantial computer memory and without forming a watermark on the document.

2. Description of Related Art

Fraud associated with written or printed documents such as bank checks or secured notes is an old and well-known problem. Fraud includes alteration, counterfeiting and copying. One type of fraudulent check is one that has been altered to provide a higher render value than originally intended. Another common fraudulent practice is printing counterfeit checks that appear identical to the original checks. Measures for authenticating such documents are as common as the counterfeit industry.

Historically, watermarks have been used to combat the counterfeit problem. A watermark is a recognizable image or pattern in paper that appears as various shades of lightness/darkness when viewed by transmitted light (or when viewed by reflected light on top of a dark background), caused by thickness variations in the paper. Watermarks vary greatly in their visibility. While some are obvious on casual inspection, others require some study to pick out. Various aids for visual inspection have been developed, such as a watermark fluid that wets the paper without damaging it.

Because watermarks are encoded on paper or other substrates, their application is expensive and time-consuming. Once the watermark has been detected and copied, the protection it affords is nullified and any inventoried watermark paper must be destroyed. Finally, changing the watermark is a time-consuming and expensive process.

Another approach for combating counterfeit is encoding the document with a pantograph. A pantograph is a printed message that is not readily distinguished on the original printed page, but becomes more clearly visible on a subsequent photocopy. Instead of being printed as fully filled-in (i.e., opaque) characters, the characters in the pantograph message are filled with a specific pixel formation. The background for the pantograph message is another pixel formation which is similar to the format pixel formation used for the characters in the message. The two formations have a similar appearance, so that they appear to blend together. A document with a pantograph message appears to have a shaded or textured background. The two patterns are designed and paired in such a way that they are more differentiated when photocopied due to individual pixels not being precisely reproduced. Thus, the pantograph message (for example, the words "void" or "copy") is more visible on the copy. Encoding with a pantograph has advantages over watermarking. A copy of a watermarked document does not bear the watermark. Only the original does. One has to know the original is watermarked, to detect a copy. No such prior knowledge is required with a pantograph.

Conventional pantographs include providing special paper which has been pre-printed with a pantograph image. The paper tray in the printer is then loaded with the pre-printed paper which has the pantograph image. The advantage of this implementation is that the pantograph is composed of higher resolution patterns than a printer is capable of imaging. However, the pre-printed paper must be printed and inventoried, which can be expensive. As with watermarking, the pre-printed pantograph paper does not lend itself to quick and inexpensive changes.

Software applications have also been used in pantograph applications. The software is used to add a pantograph to the document as a bitmap image background. The bitmap occupies a significant part of the target page and may occupy several megabytes in addition to the document itself. The bitmap image increases the size of the file requiring a greater amount of time to transfer the document to the printer. Additionally, access to the files containing the pantograph image requires control to prevent misuse. If a different pantograph message is required, a different bitmap must be implemented.

Due to differences in copying techniques used by different copy machines, the appearance of any pantograph on copied pages can differ significantly from one copier to another. Single pattern pairs often fail to produce acceptable results on a wide range of copiers. It is desirable to create a pantograph background that produces acceptable results on a variety of monochrome and color copiers.

There is a need for an improved method and apparatus to dynamically encode security images (i.e., pantograph messages) on a document without significant cost or memory consumption.

SUMMARY OF THE INVENTION

The present invention dynamically encodes pantograph messages in real time during a printing operation without consuming substantial computer or printer memory by defining a pantograph message to be displayed, and forming a background pixel formation and a foreground pixel formation. The pixel formation can be reticulated or checkered-type, for example. The foreground pixel formation and background pixel formation are related. The foreground pixel formation is chosen on the basis of the background pixel formation. For example, the foreground pixel formation may be formed by copying the background pixel formation and moving several adjacent pixels together to form pixel clusters. The foreground pixel formation is then used to create the message.

An apparatus for forming pantograph messages according to the method of the present invention comprises a processor in communication with a memory circuit and an input/output interface. The input/output interface contains software that generates a pantograph message that is to be printed. The message can be, for example, the term "copy," "void" or "duplicate." The memory circuit stores instructions directing the processor to form a background pixel formation and foreground pixel formation. The foreground pixel formation is used to fill in the outline of the letters that are the pantograph message.

A pantograph may cover an entire page or only a portion of a page. A small bitmap pattern that is only a portion of the page may be repeated across the entire area to be covered by the pantograph. The bitmap patterns may be as small as 8×8 pixels. Larger patterns of about 32×32 pixels can also be used.

Since one byte may contain 8 pixels, the memory requirements for this embodiment are quite small when compared to full page bit mapped pantographs.

By using a plurality of different small bitmaps, a plurality of different pantographs can be presented on a single document, in different regions of the document, as discussed.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

The invention is a method and apparatus for generating a pantograph in real time. The pantograph image is created by pixel representations stored in memory. The memory is a machine-readable medium that is a mechanism that provides (i.e. stores and/or transmits) information in a form readable by a machine (e.g. a computer). For example, a machine-readable medium includes read only memory (ROM), random access memory (RAM), magnetic disk storage media, optical storage media, flash memory devices, electrical, optical, acoustical, or other forms of propagated signals (e.g. carrier waves, infrared signals, digital signals). During a document printing process, the pantograph image is imaged first. To form the pantograph, a background pixel formation is chosen, the pantograph message is chosen, a foreground pixel formation is chosen. The message is formed using an outline font. The outline font is filled with the foreground pixel formation.

A pantograph has three characteristics: (1) the two pixel formations (i.e., background and foreground patterns) are similar enough to blend together on the original printed page, so that the message is difficult to see; (2) the differences between the two pixel formations causes them to contrast when photocopied, making the pantograph message more visible; and (3) the background and foreground pixel formations must be sufficiently unobtrusive so that they do not obscure the text printed on the document.

The background and foreground pixel formations used in the pantograph must be similar so that the message blends into the destination pixel formation. Yet, they must differ in such a way that the foreground filled message becomes more visible on a photocopy. This occurs because photocopiers do not reproduce individual pixels positioned as precisely as in the original document. Consequently, the foreground filled message stands out in the photocopy. Conventional patterns supplied with conventional printer programs (i.e., shading, cross-hatch, etc.) fail to meet these requirements. Thus, it is necessary to define customized pixel formations for the background and foreground of the pantograph.

Figure 1:
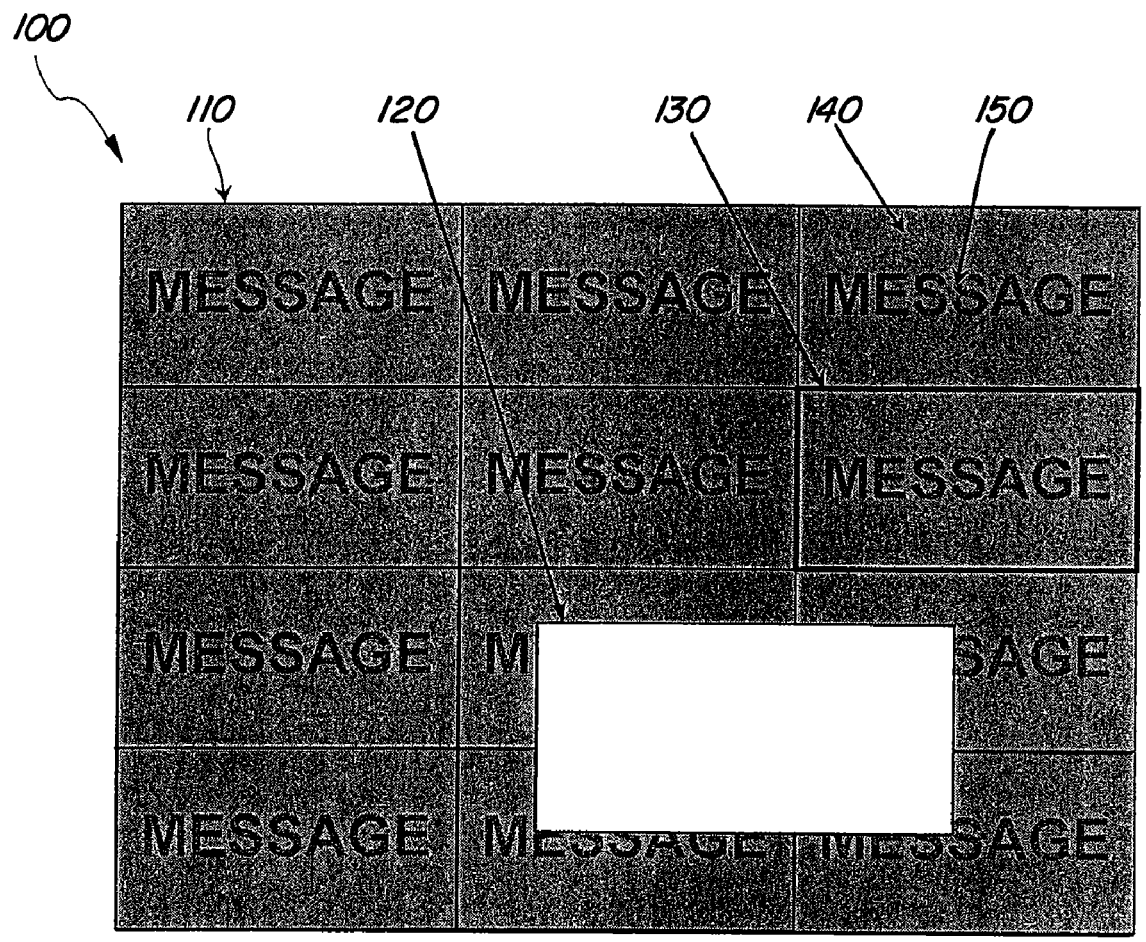
FIG. 1 is a graphical representation of a pantograph according to an embodiment of the invention.

FIG. 1 is a schematic representation of a pantograph according to one embodiment of the invention. Pantograph 100 of FIG. 1 can be used, for example, in printing medical prescriptions, checks and other documents. Pantograph 100 can occupy an entire page or a portion of a page. Inclusion region 110 is a rectangular area on the printed page that is occupied by the pantograph. Exclusion region 120 is a white rectangular area, within the inclusion region, where no pantograph pixels are printed. A pantograph can have as many exclusion regions as required. The exclusion regions are typically used for areas that require signatures, for example.

Pantograph region 130 is a rectangular area with a pantograph background 140, and optionally, a pantograph message 150. Each pantograph background 140 and pantograph message 150 form a pantograph pair. Pantograph region 130 may be tiled over the inclusion region of a page to create pantograph 100. The number of regions or cells in the pantograph depends on the relative size of the cell and the size of the inclusion region. All of the cells in a pantograph may be the same size, for example. Depending on the application, certain cells may be clipped to avoid printing any part of the pantograph outside the inclusion region 100. While cells 130 are shown as identical, different pantograph pattern pairs and/or different pantograph messages may be used in different cells within the same pantograph.

Figure 2:
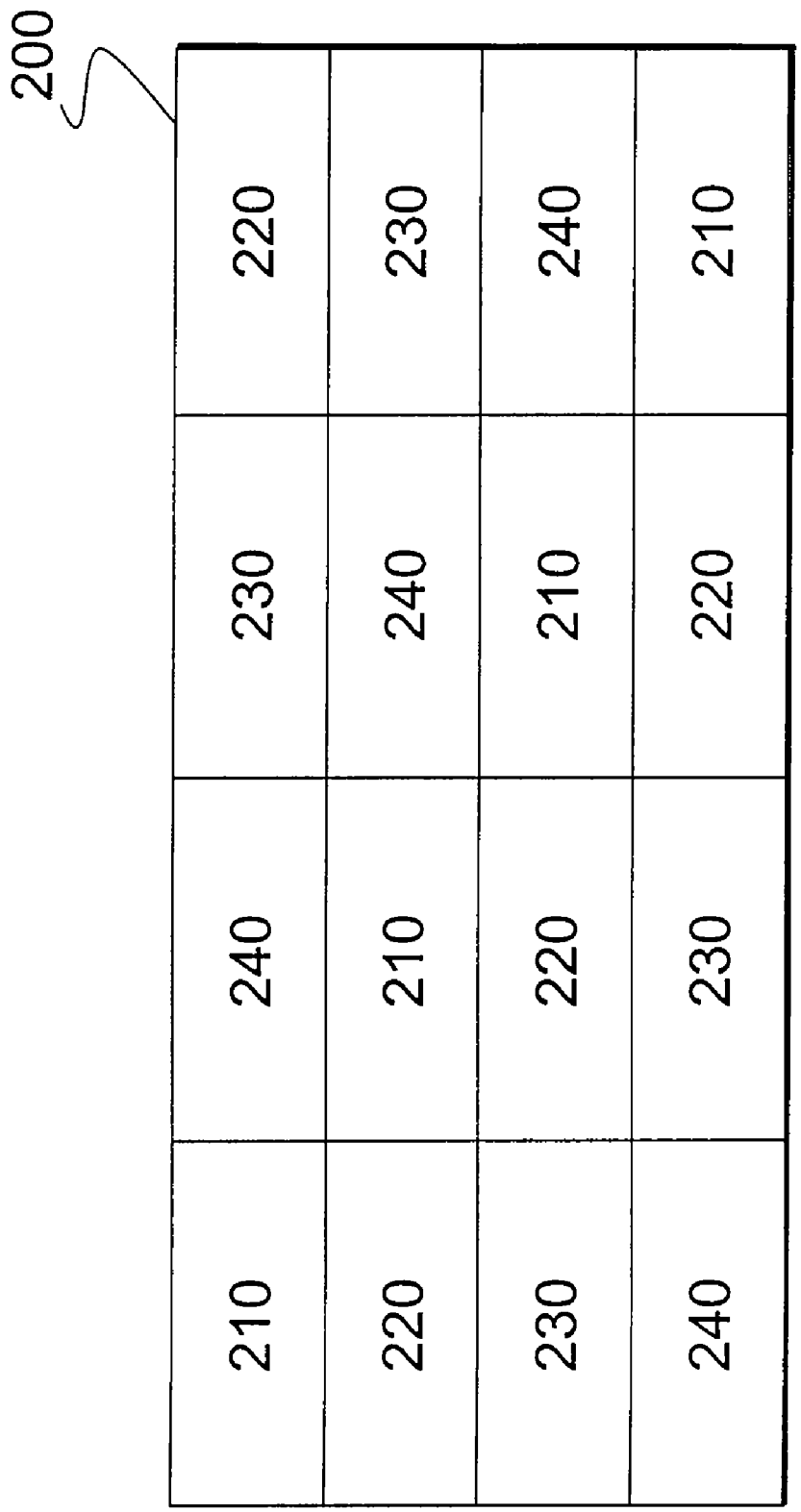
FIG. 2 is a graphical representation of the invention in which different regions of the pantograph copy is encoded with different pantographs.

FIG. 2 is a graphical representation of a pantograph according to the invention in which different regions of a document are encoded with different pantographs. Document 200 may be a check, a security document or a prescription label. Document 200 is shown as divided into 16 regions, with each of the 16 regions falling into one of four categories: 210, 220, 230 and 240. Each category can be defined by a pair of patterns (not shown) intended to display on a copy made by a different resolution copier. If, for example, a low resolution copier is used, the pantograph in region 210 would display conspicuously. On the other hand, the background and message patterns of region 230 can be selected so as to display the pantograph conspicuously on copies made on high resolution copiers.

The pantograph messages of regions 210, 220, 233 and 240 may be identical or may be different. If the pantograph messages are identical, then the message will appear at each region of the copied document. On the other hand, different pantograph messages can be selected so as to display different messages at different regions of the document.

Figure 3:
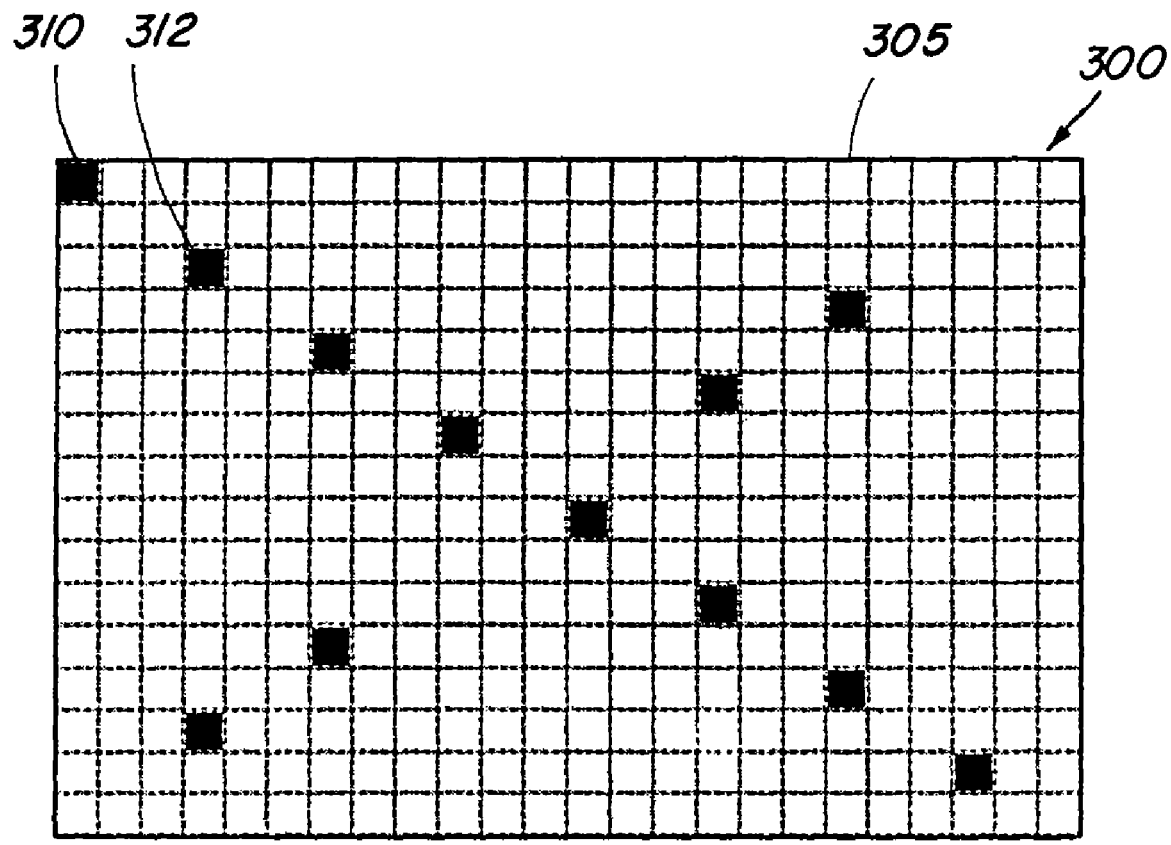
FIG. 3 is a graphical representation of a magnified portion of a background pattern according to the present invention.

FIG. 3 is a graphical representation of a magnified portion of a background pixel formation according to the present invention. The magnified background pixel formation represents a very small section of an actual pantograph. FIG. 3 shows a 24×16 pixel grid 300 having pixel 384 squares 305. When printed using a 600 dpi resolution, pixel grid 300 occupies a space of about 0.04×0.03 in$^2$. Each pixel square 305 in FIG. 3 is a spot where the printer may print the smallest dot it is capable of printing. The opaque squares (e.g., 310 and 312) are places where the printer prints dots and the white squares are places where nothing is printed.

In the embodiment of FIG. 3, the background pixel formation is devised with a relatively light density of about 3.125% to avoid obscuring the text of the source document. The background pattern formed by the pixels looks like an "x" spread across grid 300.

Figure 4:
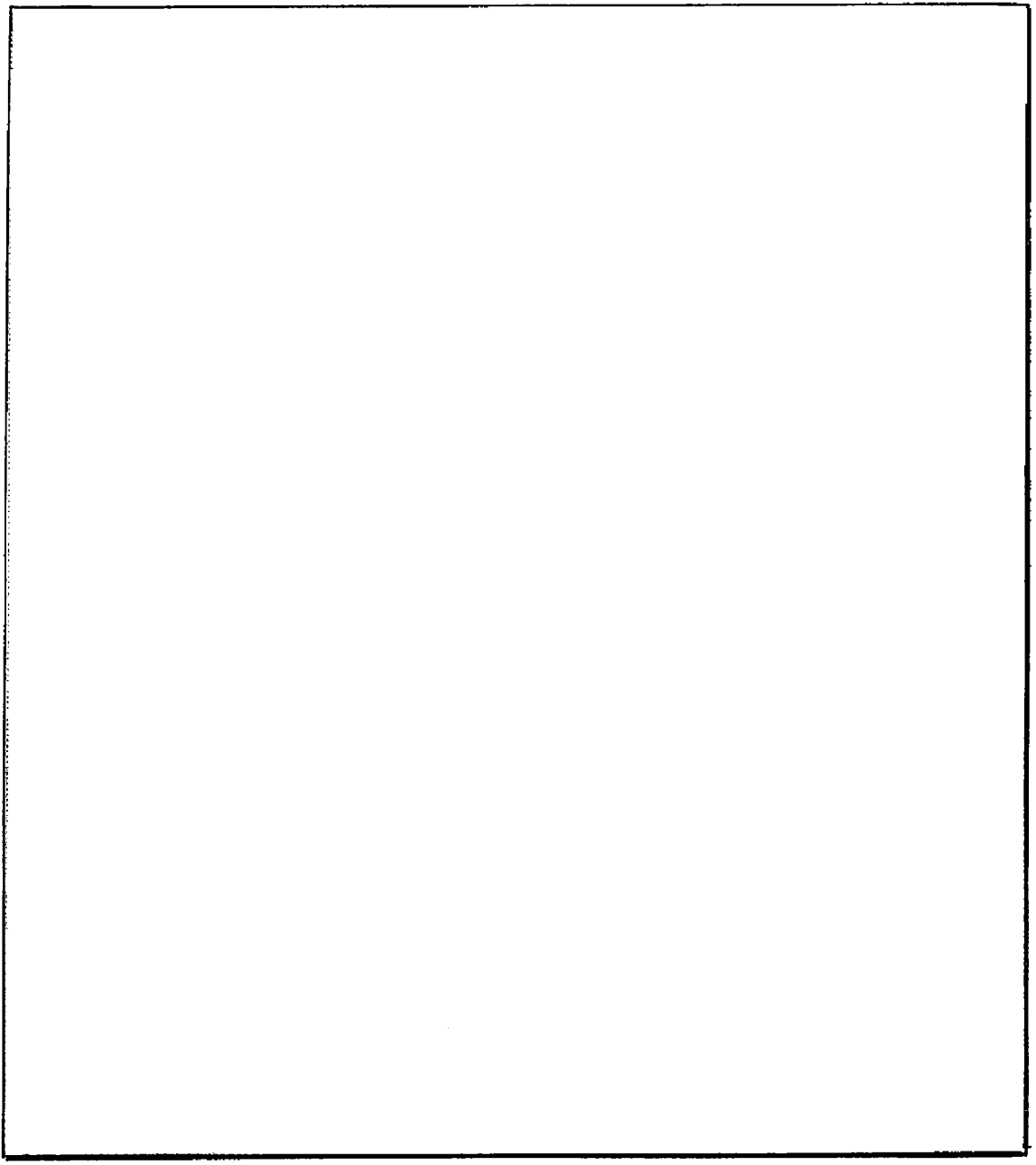
FIG. 4 is a graphical representation of the background pattern of FIG. 3 not magnified.

FIG. 4 shows the unmagnified background pixel formation of FIG. 3. Here, the pixels are small and the so-called "x" pattern is not visible to the naked eye. A conventional printer language program can be used to configure and print the background pixel formation. One such language is the Printer Command Language ("PCL") by the Hewlett-Packard Company.

Figure 5:
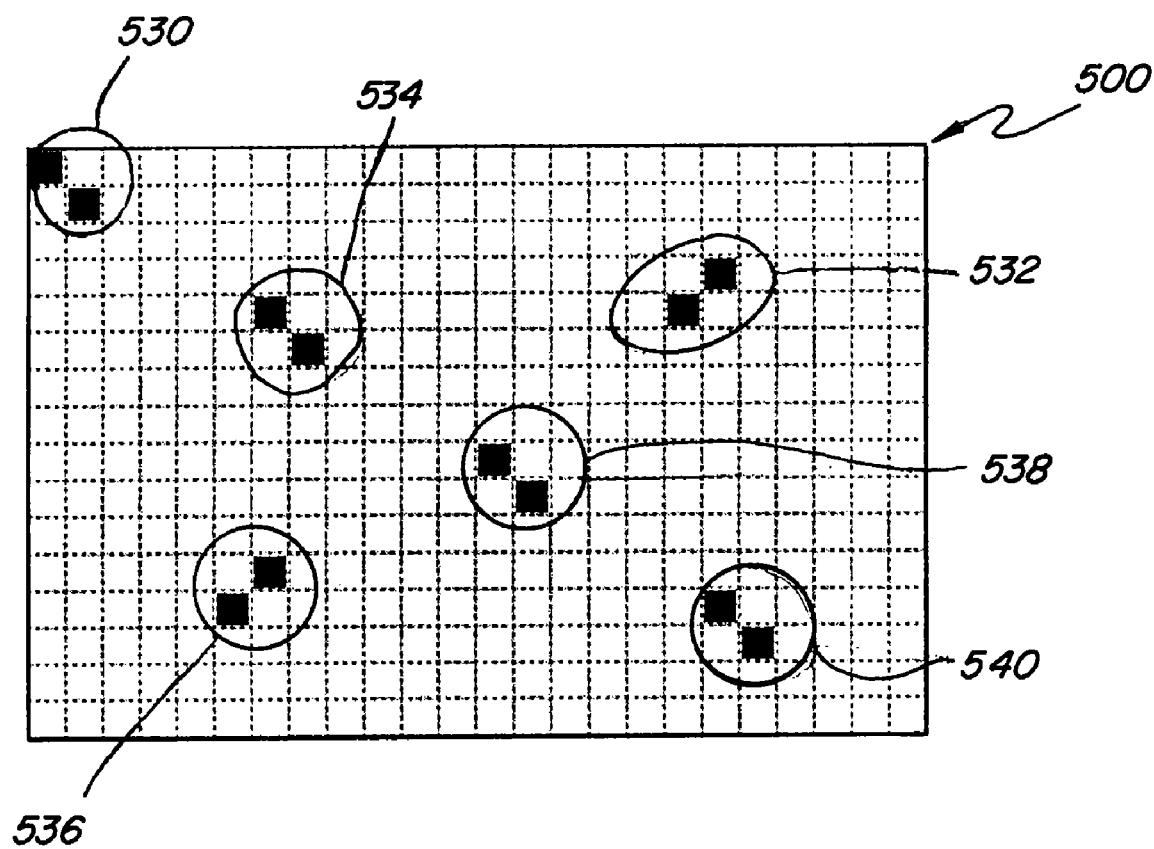
FIG. 5 is a graphical representation of a portion of a foreground pattern used for displaying a pantograph message.

FIG. 5 is a graphical representation of a portion of a foreground pixel formation for generating a message. The pixel formation of FIG. 5 is also in a 24×16 matrix, occupying a space of about 0.04×0.03 in$^2$. The pattern shown by the pixels of FIG. 5 is consistent with the "x" background pattern of FIG. 3, except that the opaque pixels are now merged closer to each other to form pixel clusters. Pixel clusters 530, 532, 534, 536, 538 and 540 are formed by merging adjacent pixels in the pixel formation. The total number of opaque pixels in both FIGS. 3 and 5 remains constant at 12.

The pixel formation shown in FIG. 5 can be used to fill-in the letter of the pantograph message that is printed with the background pixel formation. It should be noted that while the pixel formations are labeled as background and foreground, they can be swapped (using the foreground formations as the background and using the background formations as the message) without departing from the principles of the invention. When paired and printed, the combination of background and foreground pixel formation provides a pantograph which is not readily visible to the naked eye, but is readily apparent when copied by a copier.

Figure 6:
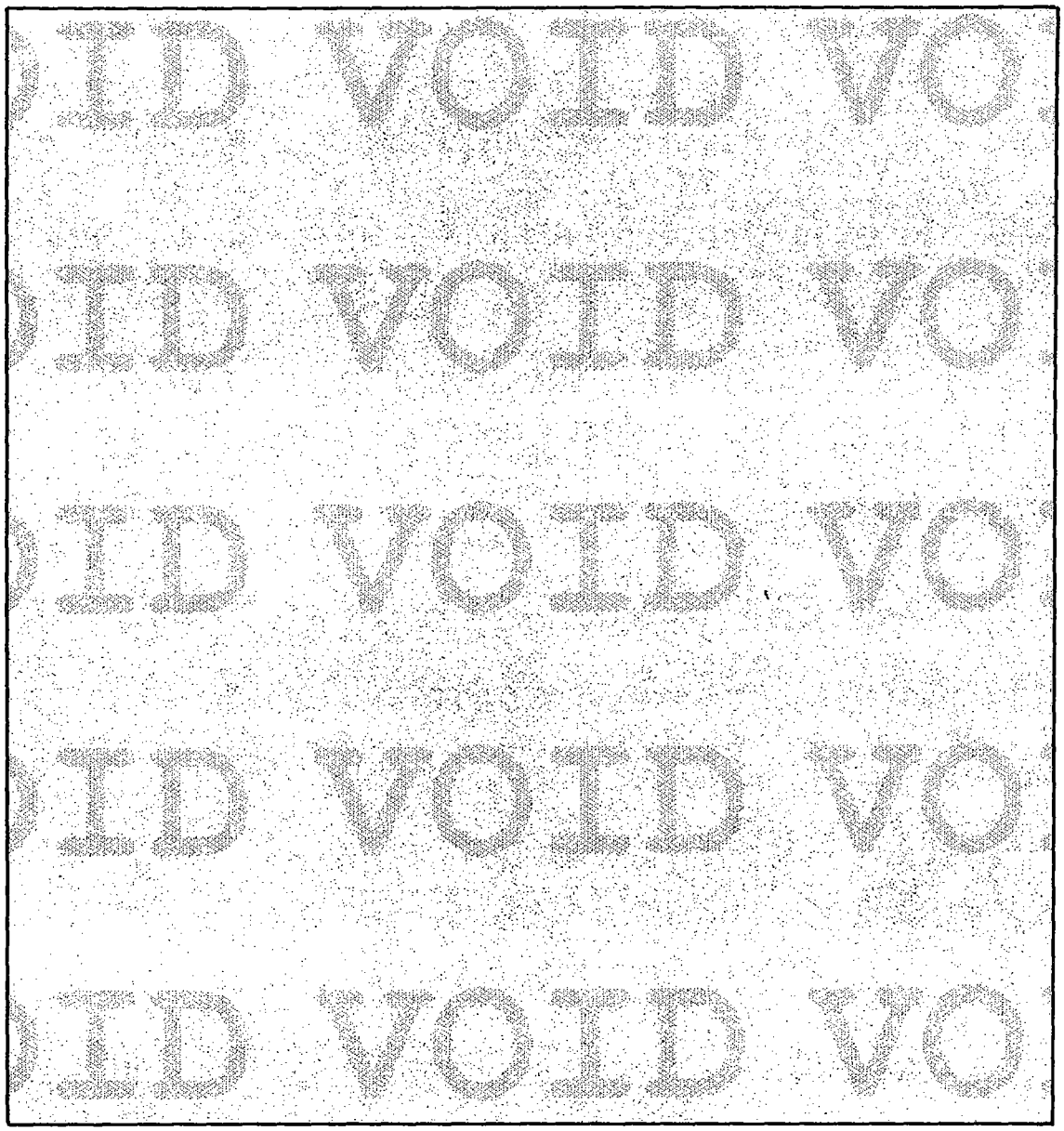
FIG. 6 is a graphical representation of the full foreground pattern of FIG. 5 when overlaid on the background of FIG. 4 and after being copied.

FIG. 6 is a graphical representation of a full foreground pixel formation of FIG. 5 overlaid on the background of FIG. 4, after being copied. The pantograph message "VOID" is readily apparent.

While the pantograph of FIG. 6 is reasonably visible on typical consumer copiers, it is less visible on high resolution copiers and color copiers. To address this problem, one option is to increase pixel density. However, as pixel density increases, the message tends to be more visible on the original. This is because the pairing of background and foreground pixels tends to form diagonal stripes across the area covered by the pattern. The diagonal stripes form a recognizable pattern on the pantograph and is visible to the naked eye. In one embodiment of the invention, this problem is overcome by staggering the pixel clusters in different arrangements.

Figure 7:
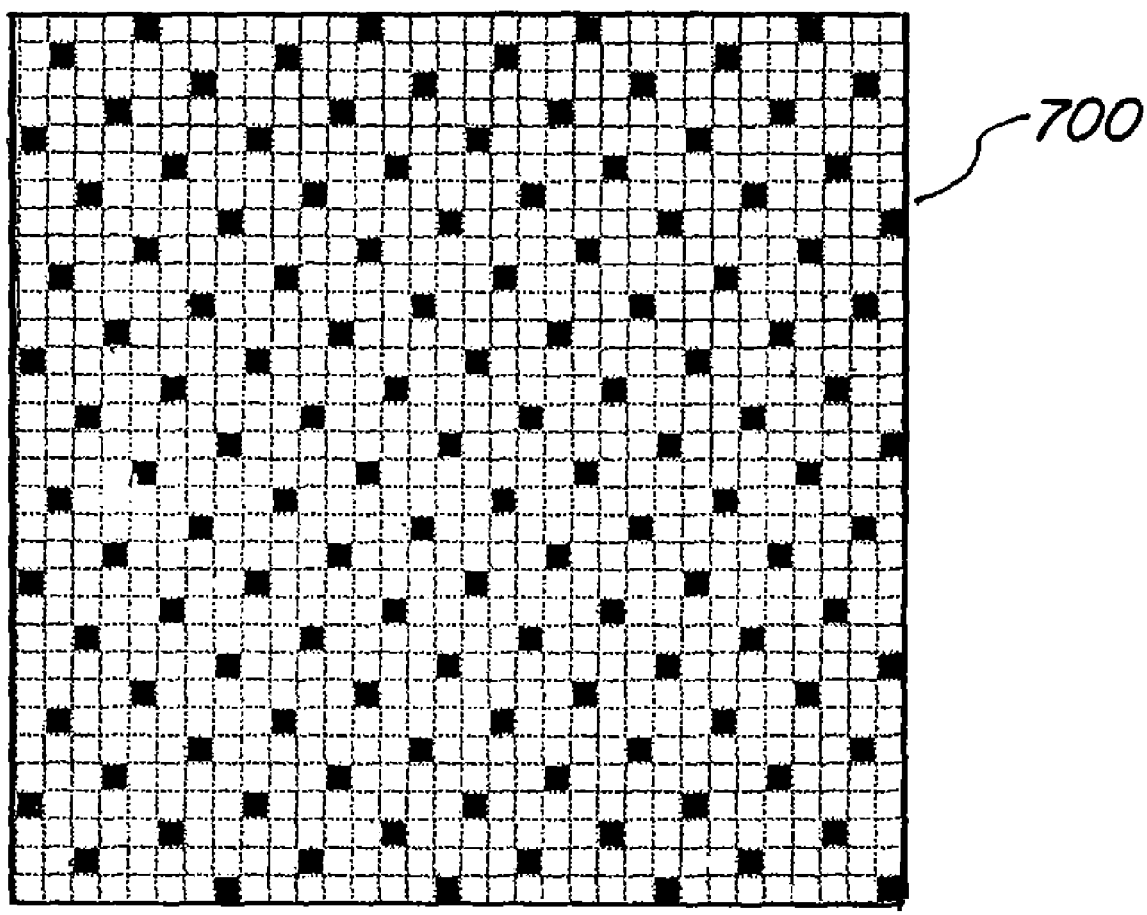
FIG. 7 is a graphical representation of an exemplary background pattern for a pantograph on a 32×32 grid.

FIG. 7 is a representation of a background pixel formation on a 32×32 grid. FIG. 7 shows an increased density of opaque pixels as compared to that shown in FIG. 3. This provides a more visible pantograph pattern out of a possible 1024. Grid 700 of FIG. 7 shows 128 opaque pixels. The pattern shows that one out of every 8 pixels in each row is an opaque pixel. A generic background pixel formation like that shown in FIG. 7 can be selected and a foreground pixel formation as a function of the background formation. Grid 700 is magnified. Without magnification the grid occupies a space of about 0.05×0.05 int.

Figure 8:
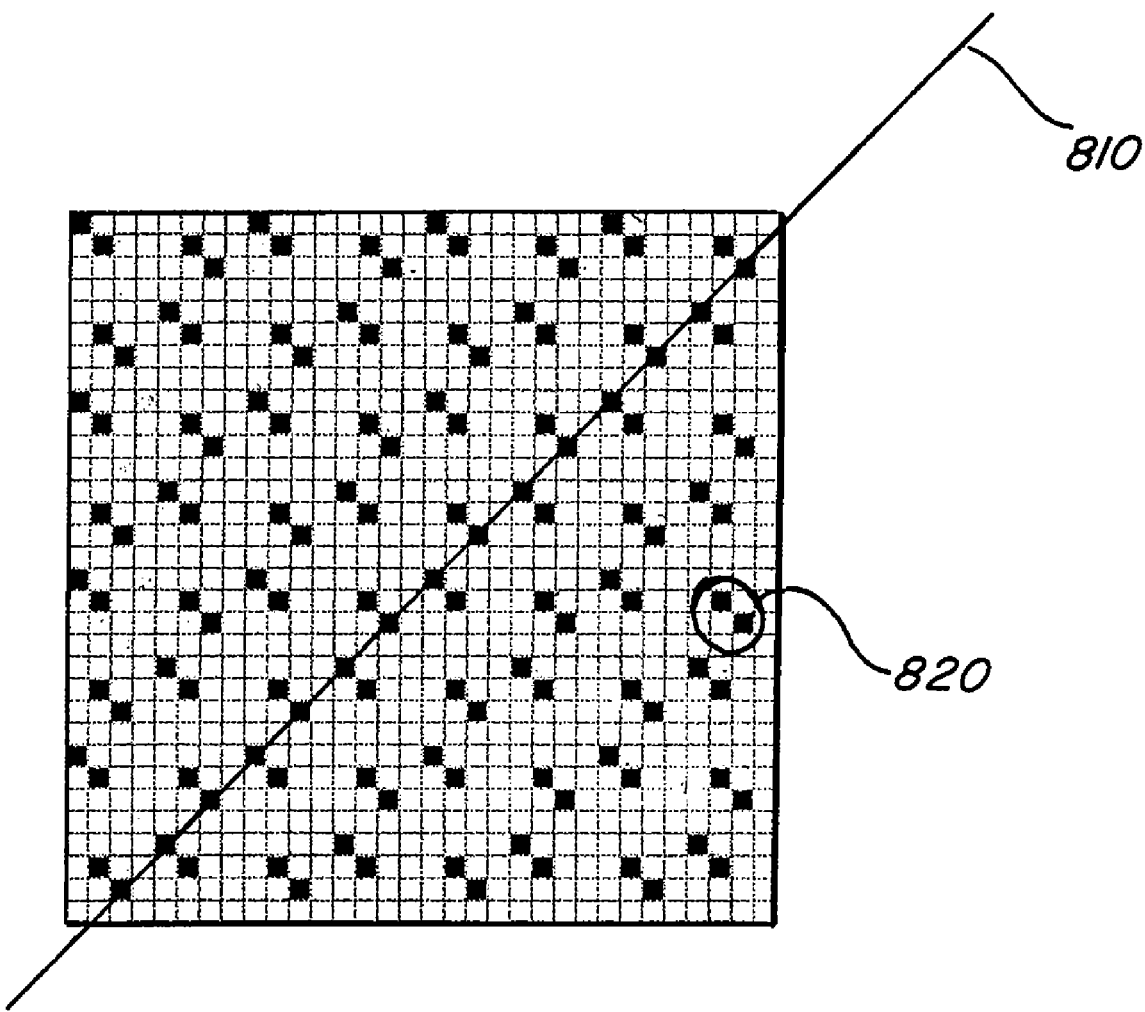
FIG. 8 is a graphical representation of a foreground pattern formed from the pantograph background of FIG. 7.

FIG. 8 is a graphical representation of a foreground pixel formation formed from the background formation of FIG. 7. The pixel formation shown in FIG. 8 is complementary to the foreground pixel formation of FIG. 7. In FIG. 8 opaque pixels from adjacent rows are merged together to form opaque clusters. One such opaque cluster is shown as pixel cluster 820. The clusters form a cluster pattern which appears diagonal along axis 810. This cluster pattern is used to fill the letters of the pantograph message.

Figure 9:
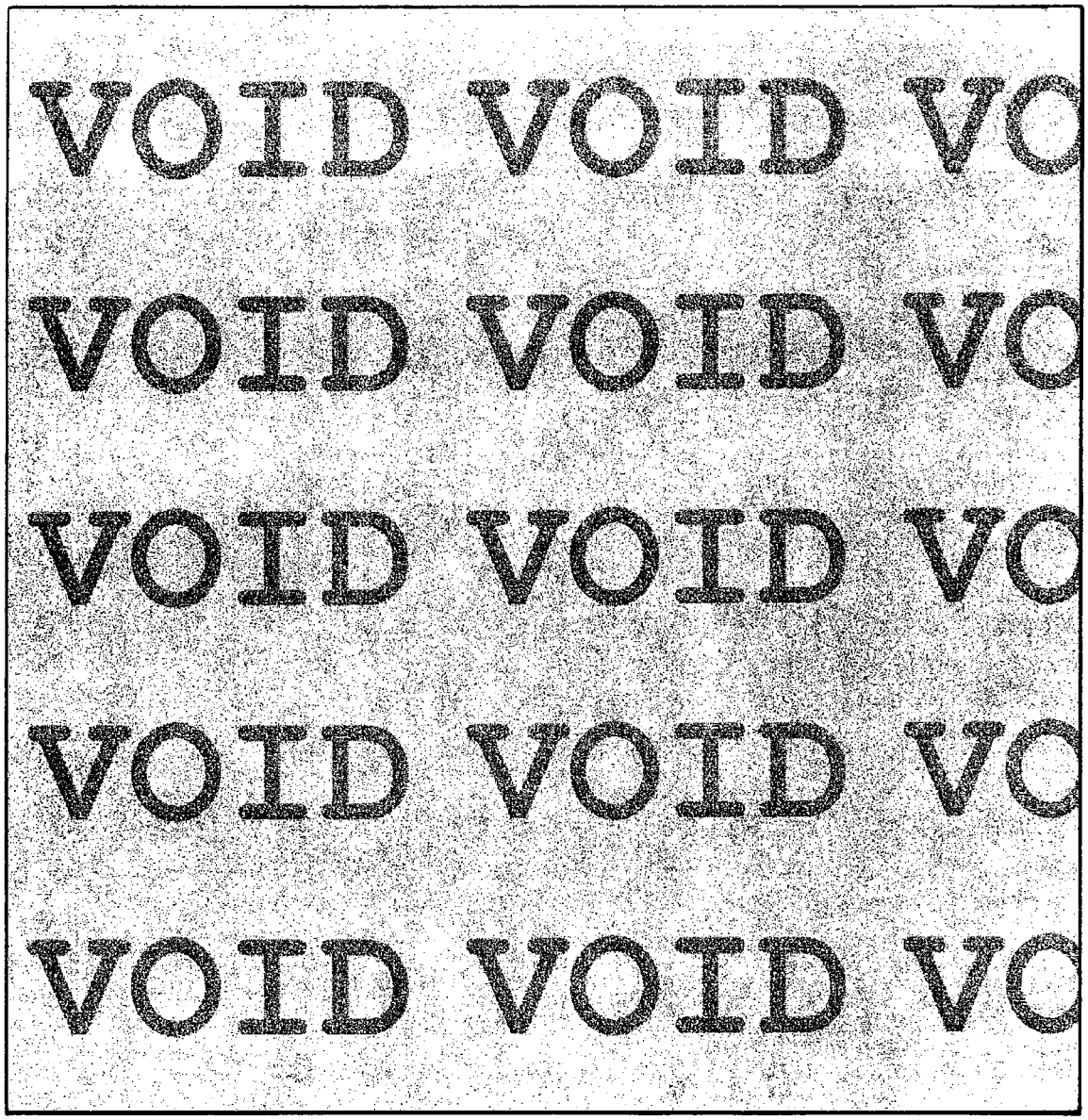
FIG. 9 is a graphical representation of a pairing of the pantograph background of FIG. 7 with the pantograph message of FIG. 8 and after being copied.

FIGS. 7 and 8 all paired together to complete the pantograph. The foreground cluster pattern shown in FIG. 8 is used to fill the letters of the pantograph message. The pantograph message and the background pixel formation of FIG. 7 are then printed. Copying the printed background pixel formation of FIG. 7 with the pantograph message formed from the formation of FIG. 8 is shown in FIG. 9. The pantograph message appears more vividly when copied by some copiers having higher resolution.

Introducing additional noise into the background and into the pantograph message can further reduce visibility of the pantograph message. In one embodiment, noise is introduced into one or both of the pantograph background or message by randomly inserting clusters of pixels.

Figure 10:
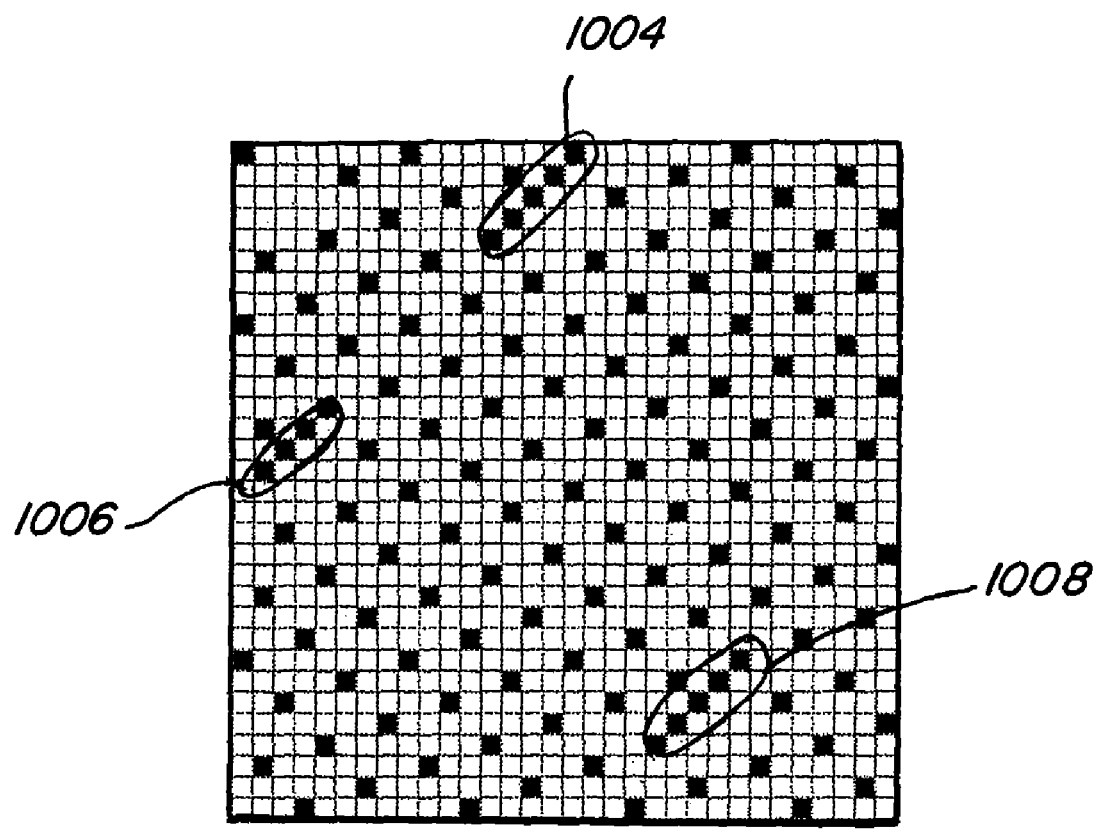
FIG. 10 is a graphical representation of the pantograph background of FIG. 7 with added noise pixels.

FIG. 10 is a graphical representation of the background pixel formation of FIG. 7 with added noise pixels. Noise pixels 1004, 1006 and 1008 have been randomly inserted. While they do not significantly interfere with the background pixel formation or message, they do provide a level of optical interference which can distract the viewer from the underlying pantograph message in the original print. The location of the noise pixels is arrived at by experimentation in order to satisfactorily camouflage the message in the original while still letting the pantograph message come out reasonably clear on the printed page.

Figure 11:
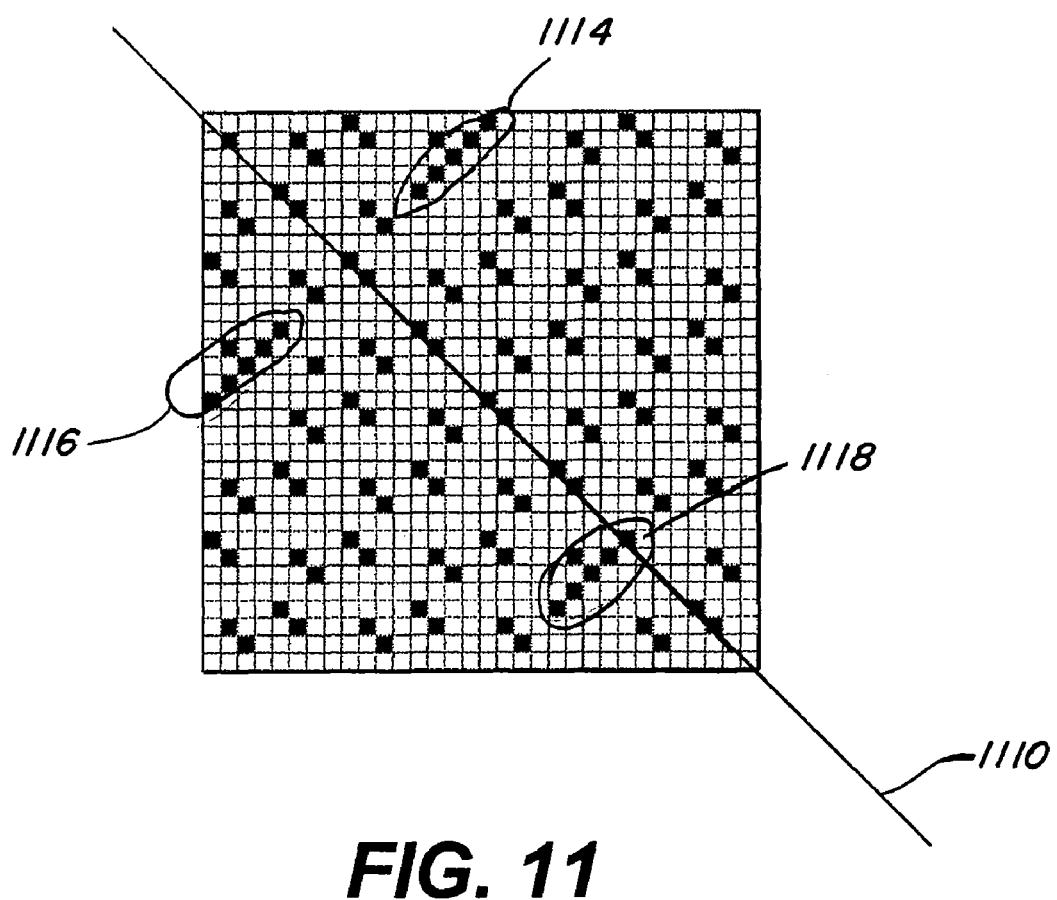
FIG. 11 is a graphical representation of a foreground formed from the pantograph background of FIG. 10.
Figure 12:
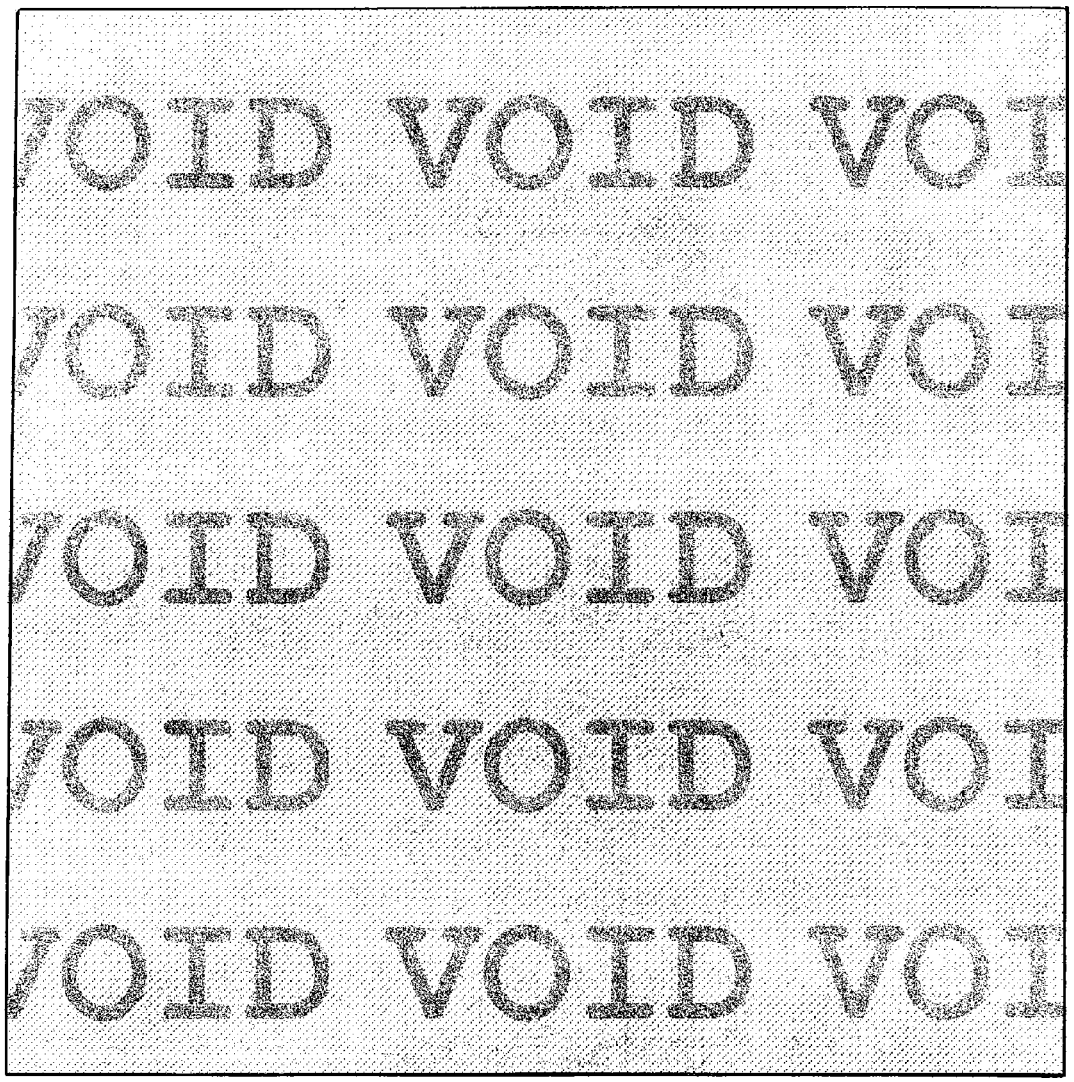
FIG. 12 is a graphical representation of a pairing of the pantograph background of FIG. 10 and the pantograph foreground of FIG. 11 and after being copied.

FIG. 11 is a graphical representation of the foreground cluster pattern of FIG. 8 with additional noise pixels. Noise pixels 1114, 1116 and 1118 have been positioned as shown because of resolution obtained from experimentation. Noise pixels 1114, 1116 and 1118 in the foreground complement noise pixels 1004, 1006 and 1008 in the background (FIG. 10) and provide a level of optical interference to obscure the pantograph message in the original documents. FIG. 12 is an unmagnified copy of the pantograph formed by combining the background pixel formation of FIG. 10 and the foreground pixel formation of FIG. 11. The Figure illustrates the results obtained when using a copier with a resolution of about 600 dpi.

High resolution copiers may require further refinement of the pantograph. In higher resolution copiers, the pantograph message tends to remain obscure. It has been discovered that varying the resolution between the background pixel formation and foreground cluster patterns provides a pantograph with sufficient contrast for higher resolution copies.

Figure 13:
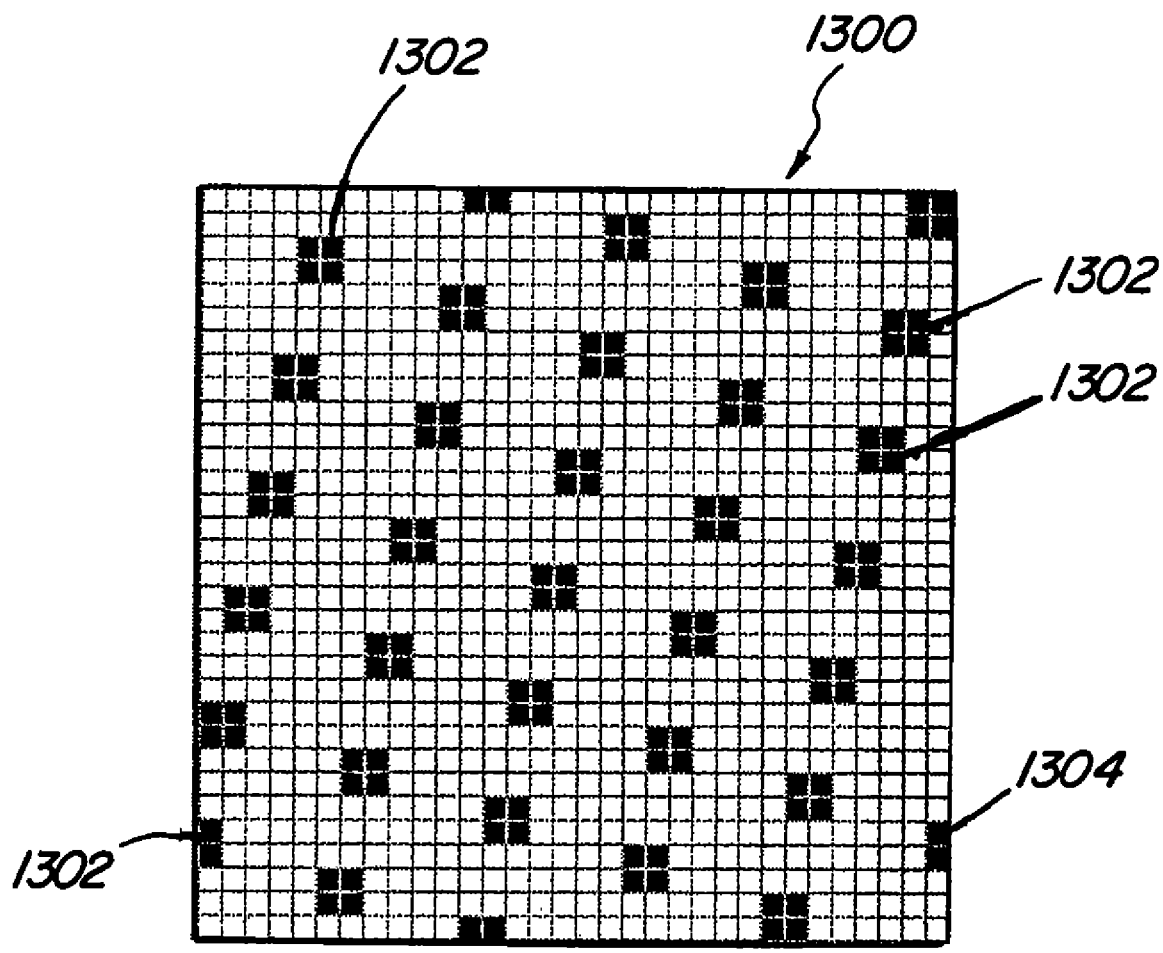
FIG. 13 is a graphical representation of a pattern that can be used either as a foreground or a background.

FIG. 13 is a graphical representation of a pixel cluster pattern that can be used either as a foreground or a background. Pattern 1300 of FIG. 13 can be used as the foreground pixel formations with, among others, the background pixel formation of FIG. 7. Pattern 1300 could also be used as the foreground pixel formations with the pixel background formation of FIG. 10. FIG. 13 uses opaque pixel clusters arranged on a grid. Clusters 1302 and 1304 are formed by joining four adjacent pixels. This pattern is particularly suitable for use with copiers having resolutions higher than 600 dpi.

The opaque pixel clusters of FIG. 13 are larger than those of FIG. 8. The larger clusters have been found to work better with high resolution copiers and color copiers. This variation of the foreground clusters can be viewed as varying the resolution of the pantograph message patterns. Simply, the use of larger pixel clusters is not alone the answer for higher resolution printers. Exceptionally large pixel clusters result in a pantograph that is readily visible to the naked eye in the original documents. Thus, the size of the clusters must be varied so as to provide sufficient resolution for the copier while still disguising the pantograph message on the original printed document.

Figure 14:
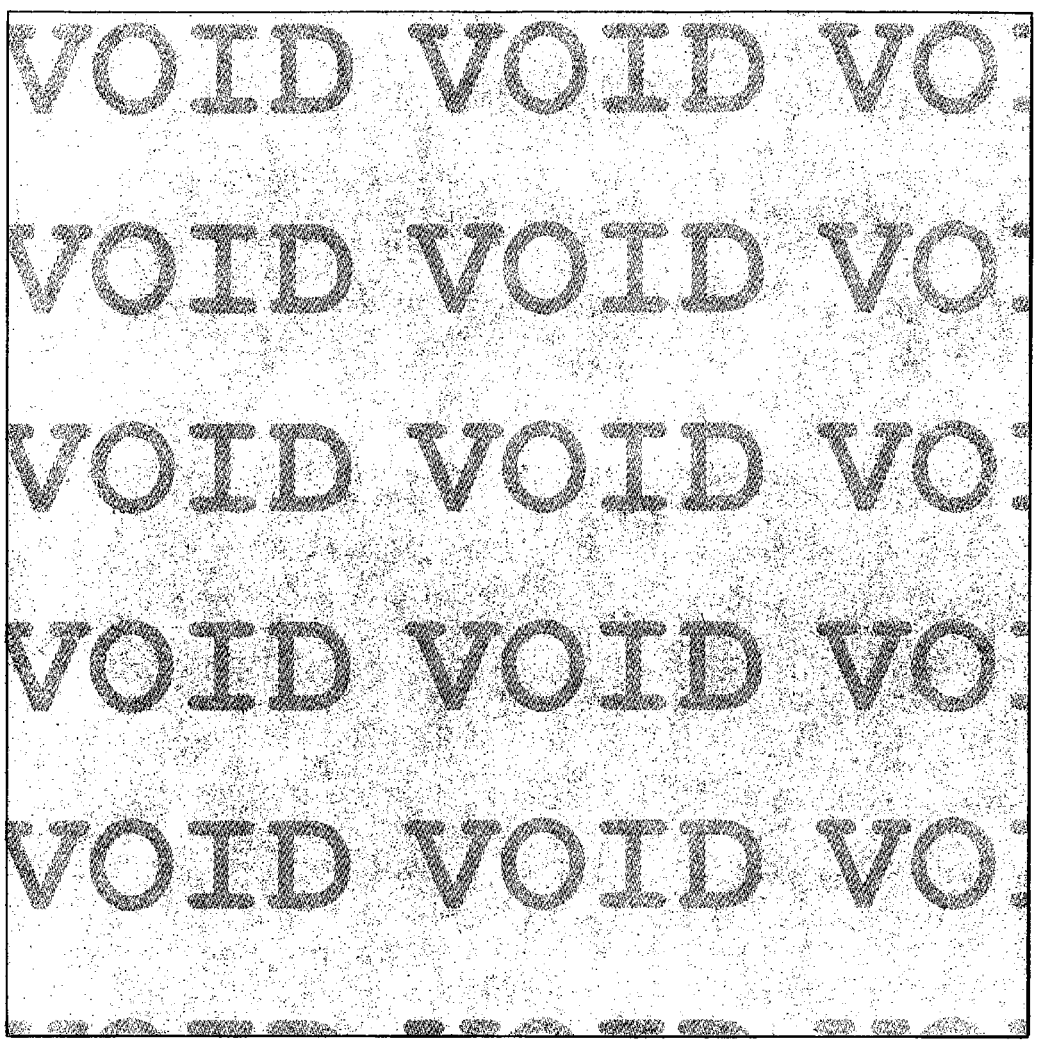
FIG. 14 is a graphical representation of a pairing of a background of FIG. 7 and foreground of FIG. 13 and after being copied.

FIG. 14 is a copy of the pantograph formed by pairing the background pixel formation of FIG. 7 with the foreground pixel cluster pattern of Figure. The original hidden pantograph hid message in the word "VOID".

Figure 15:
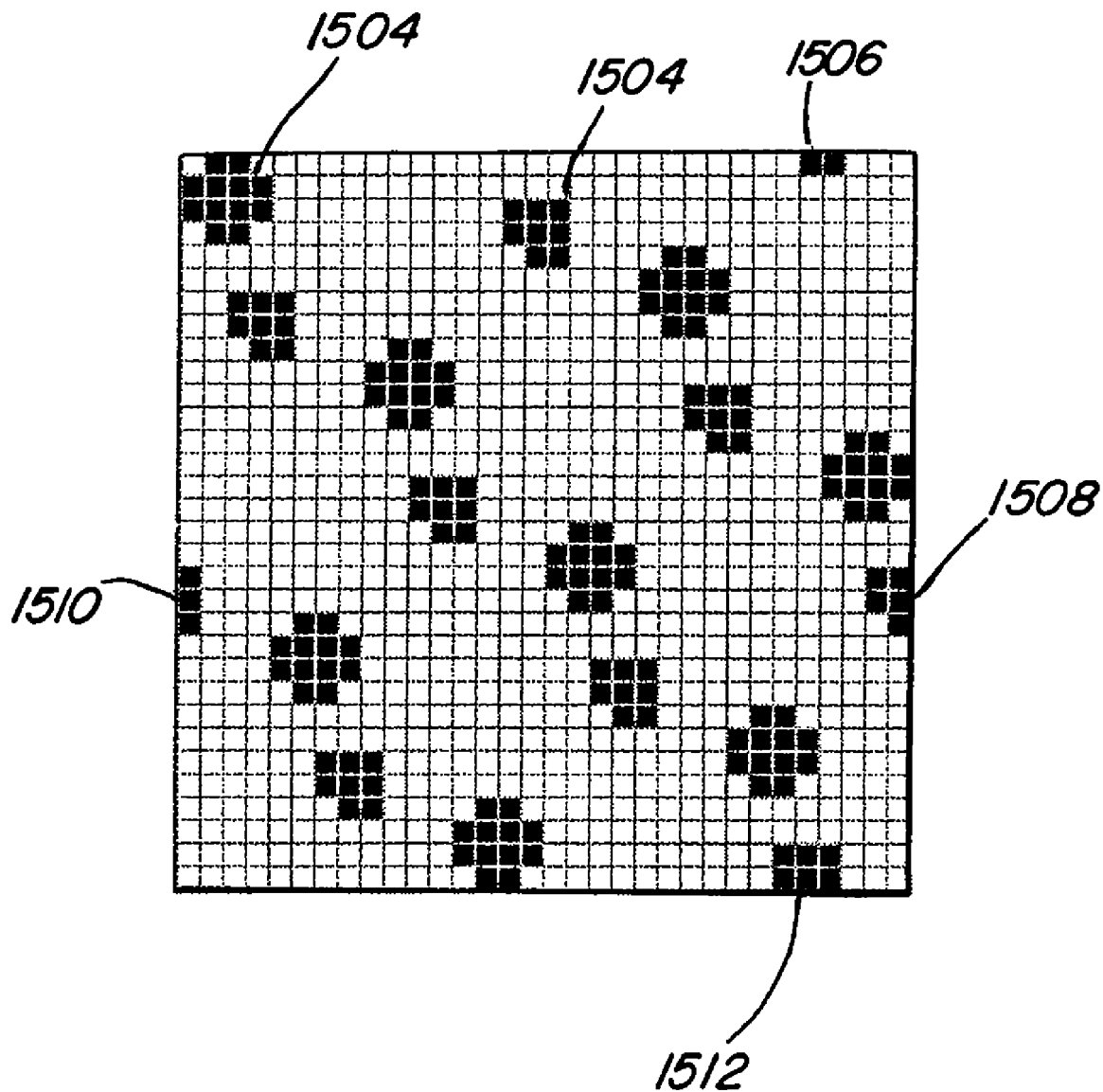
FIG. 15 is a graphical representation of a pattern that can be used either as a foreground or background pattern.

FIG. 15 shows another opaque pixel cluster pattern for a pantograph message. The cluster pattern of FIG. 15 may be used as a foreground pattern with the background pixel formation of FIG. 7. Pixel clusters 1502, 1504, 1506, 1508, 1510 and 1512 are larger and include more pixels than those of previous embodiments.

Figure 16:
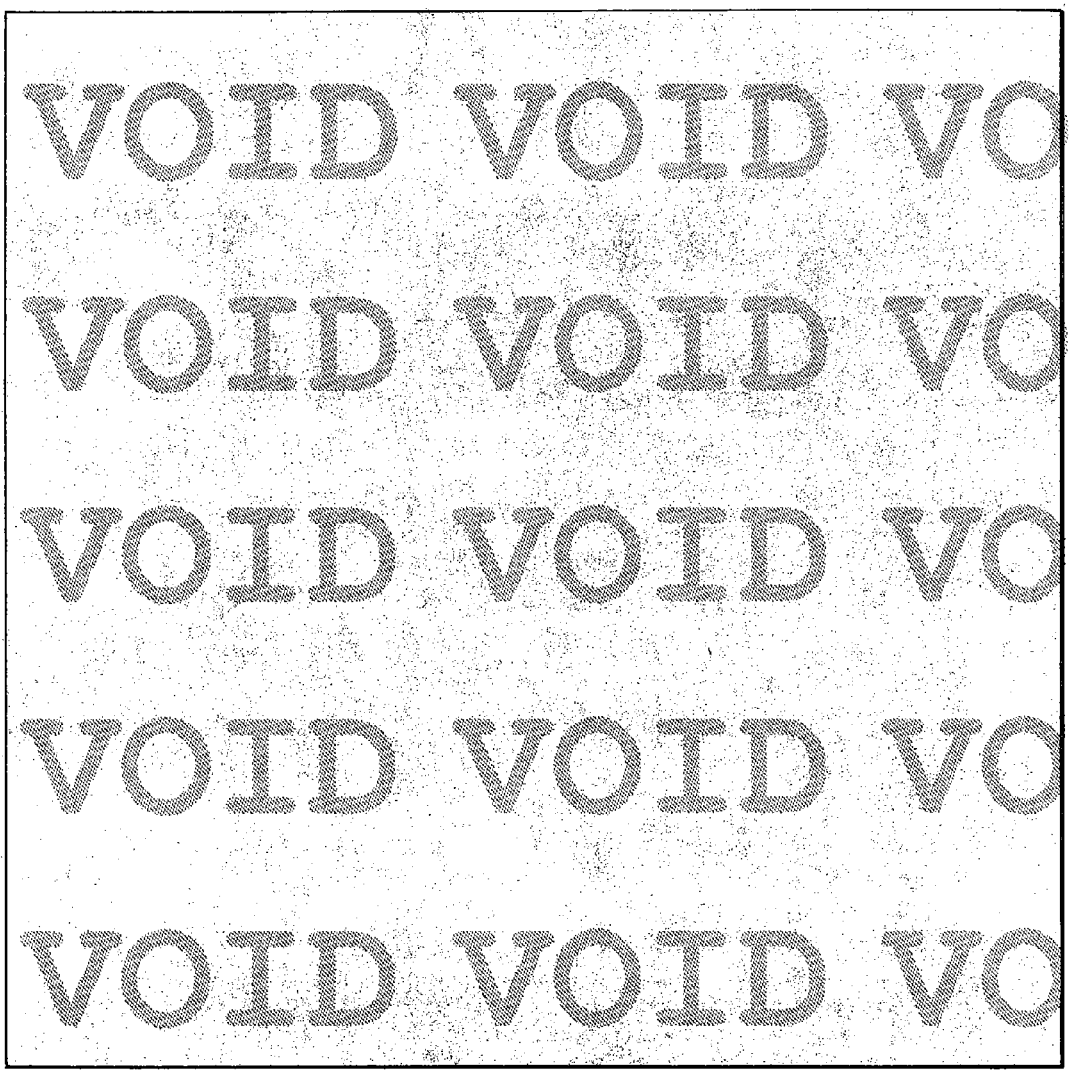
FIG. 16 is a graphical representation of a copied pantograph which was formed by combining the background of FIG. 7 with the pantograph message of FIG. 15.

FIG. 16 is copied pantograph which was formed by combining the background pixel formation of FIG. 7 with the foreground pixel cluster pattern of FIG. 15 filling in the letters of the message. In FIG. 16, the pantograph message "VOID" is readily visible.

Another aspect of the invention relates to providing an interference pattern which can be combined with the pantograph to further camouflage the pantograph message in the original document. The interference pattern can be a bitmap with graphical characters, for example. The interference pattern can be one or two characters that produce a repeatable image. The characters can have any color, including white. The interference pattern can be produced as a repeatable image over the entire pantograph image. This creates an interference pattern by removing pixels from both the foreground and background. The interference pattern breaks up the boundary between the background and the message and draws attention away from the pantograph message. Finally, the interference patterns make it possible to use pairs of patterns for the pantograph that would otherwise make the message too easily visible on the printed page.

Figure 17:
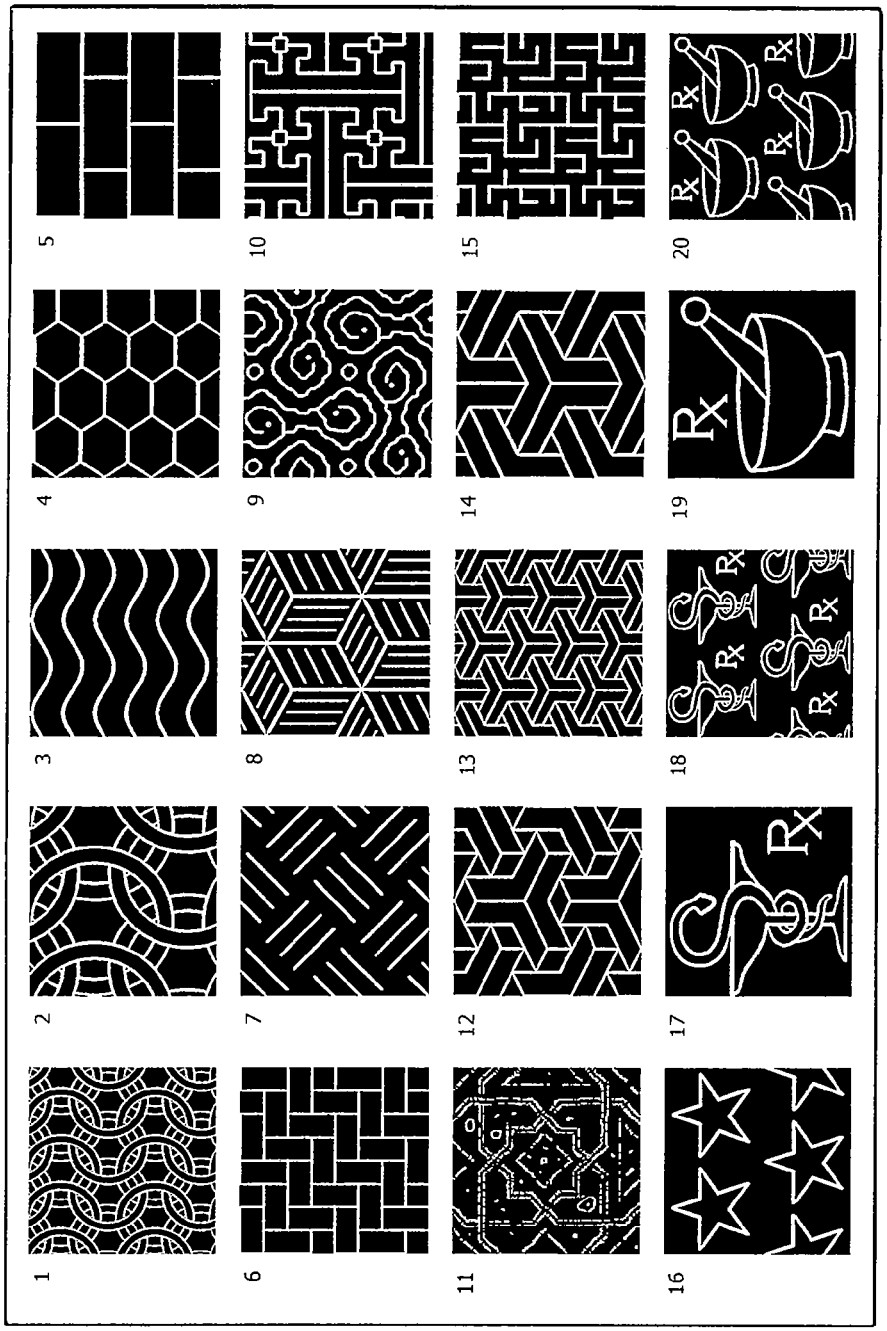
FIG. 17 is a graphical representation of several exemplary interference patterns that may be used for obscuring a pantograph message.

FIG. 17 shows several exemplary interference patterns which can be used, in addition to the techniques disclosed herein, to obscure a pantograph message. In one embodiment, the interference pattern is programmed in the firmware so that it is automatically overlaid on the pantograph after the designer selects the pantograph parameters. The interference pattern can also be provided as an optional feature, allowing the designer to select its use on the basis of such factors as the pantograph message, the printer's capability and the color of the toner.

Different copiers provide photocopies of different resolutions and it is difficult to devise a single pantograph that works well with all copiers. To this end, the present invention produces a pantograph background that shows a visible message on copies from a large variety of photocopiers, by using two or more different pantograph pattern pairs on a page, with each pattern pair optimized for a different resolution copier. A pantograph area is divided into multiple regions that are occupied by the different pantograph pattern pairs. The regions may be arranged in a checkerboard configuration or any other suitable formation. This optimization can be extended to provide multiple resolutions.

The different pantograph pattern pairs (i.e., background and message patterns) in this scheme may be designed to produce acceptable results on different copiers with different resolutions. Copies from a monochrome copier plainly show the pantograph image optimized for low resolutions, while copies from a color copier plainly show the image optimized for higher resolutions.

Figure 18:
FIG. 18 is a graphical representation of a pantograph message with an interference pattern.

FIG. 18 shows a graphical representation of a pantograph message with an interference pattern. The interference pattern, which appears as parallel waves, improves the usefulness of the pantograph by making the pantograph message less noticeable on the original printed page.

What is claimed is:

1. A non-transitory machine-readable medium that provides instructions which when executed by a processor cause the processor to perform operations, comprising:
    forming a background pixel formation from a plurality of pixels for use as a background in a pantograph; and
    forming a foreground pixel formation by moving adjacent pixels in the background pixel formation to form pixel clusters.

2. The non-transitory machine-readable medium of claim 1, further comprising instructions which when executed by the processor cause the processor to:
    image a message;
    fill the message with the foreground pixel formation; and
    merge the filled message and the background pixel formation.

3. The non-transitory machine-readable medium of claim 1, further comprising instructions which when executed by the processor cause the processor to:
    image a message;
    fill the message with the background pixel formation; and
    merge the filled message and the foreground pixel formation.

4. The non-transitory machine-readable medium of claim 1, wherein at least one of the pixels in a pixel cluster in the foreground pixel formation are in the same location as one of the pixels in the background pixel formation.

5. The non-transitory machine-readable medium of claim 1, wherein the number of pixels in the background pixel formation equals the number of the pixels in the foreground pixel formation.

6. The non-transitory machine-readable medium of claim 1, wherein the number of pixels in the background pixel formation does not equal the number of pixels in the foreground pixel formation.

7. The non-transitory machine-readable medium of claim 1, wherein the pixels in the background pixel formation define a first tonal density and the pixels in the foreground pixel formation define a second tonal density, the first and second tonal density being substantially identical.

8. The non-transitory machine-readable medium of claim 1, wherein the background pixel formation and the foreground pixel formation are reticulated.

9. A device for forming a pantograph, the device comprising:
    a processor;

a memory in communication with the processor, the memory storing instructions directing the processor to form a background pixel formation from a plurality of pixels for use as a background of the pantograph and form a foreground pixel formation using the background pixel formation to form pixel clusters; and an input/output interface in communication with the processor, the input/output interface receiving a source document upon which the pantograph is formed.

10. The device of claim 9, wherein the memory stored instructions direct the processor to fill the pantograph message with the foreground pixel formation and merge the filled message and the background pixel formation.

11. The device of claim 9, wherein the memory stored instructions direct the processor to fill the pantograph message with the background pixel formation and merge the filled message and the foreground pixel formation.

12. The device of claim 9, wherein the memory stores instructions to form a foreground pixel formation by relocating a plurality of adjacent pixels in the background pixel formation to form a plurality of pixel clusters.

13. The device of claim 9, wherein the number of pixels in the background pixel formation equals the number of pixels in the foreground pixel formation.

14. The device of claim 10, wherein the memory stores combining instructions that merge the background pixel formation and the filled pantograph message so that each of the pixel clusters in the filled message have at least one pixel that overlays with at least one of the pixels in the background pixel formation.

15. The device of claim 9, wherein the number of pixels in the background pixel formation are not equal to the number of pixels in the foreground pixel formation.

16. The device of claim 9, wherein the processor includes a printer.

17. The device of claim 10, wherein the memory stores instructions to define an interference pixel pattern and merge the interference pixel pattern with the background pixel formation and the filled message.

18. An apparatus for devising a pantograph, the apparatus comprising a machine readable medium containing instructions for directing a processor to perform the following steps:
  receive a message to be displayed as a pantograph;
  devise a background pixel formation;
  devise a foreground pixel formation based on the background pixel formation;
  fill the characters of the pantograph message with the foreground pixel formation; and
  merge the filled pantograph message and the background pixel formation.

19. The apparatus of claim 18, wherein the machine readable medium provides instructions to form the foreground pixel formation by relocating a plurality of adjacent pixels in the background pixel formation to form the plurality of pixel clusters.

20. The apparatus of claim 19, wherein at least one of the pixel clusters is formed so as to have at least one pixel overlap with one of the pixels in the background pixel formation when the pantograph message is merged with the background pixel formation.

21. The apparatus of claim 18, wherein the number of pixels in the background pixel formation equal the number of the pixels in the foreground pixel formation.

22. The apparatus of claim 18, wherein the pixels in the background pixel formation defines a first tonal density and the pixels in the foreground pixel formation define a second tonal density, the first tonal density and the second tonal density being substantially identical.

23. The apparatus of claim 18, wherein a combination of the processor and the machine readable medium defines a firmware.

24. The apparatus of claim 19, wherein the firmware resides in an electronic circuit.

* * * * *